United States Patent
Sahu et al.

(10) Patent No.: US 6,733,564 B1
(45) Date of Patent: May 11, 2004

(54) PROCESS FOR RECOVERY OF NICKEL FROM SPENT CATALYST

(75) Inventors: Kamala Kanta Sahu, Jamshedpur (IN); Banshi Dhar Pandey, Jamshedpur (IN); Prem Chand, Jamshedpur (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/095,526

(22) Filed: Mar. 13, 2002

(51) Int. Cl.$^7$ .................................................. B22F 9/24
(52) U.S. Cl. ........................ 75/353; 75/374; 423/150.2; 502/24
(58) Field of Search ................ 75/353, 374; 423/150.2; 502/24

(56) References Cited

U.S. PATENT DOCUMENTS

| | | | |
|---|---|---|---|
| 2,576,314 A | 11/1951 | Forward | |
| 3,891,521 A | 6/1975 | Carlin | |
| 4,474,735 A | 10/1984 | Rastas et al. | |

FOREIGN PATENT DOCUMENTS

| JP | 60-102945 | * | 6/1985 |
|---|---|---|---|

OTHER PUBLICATIONS

International Search Report for PCT/IN02/00061, filed Mar. 21, 2002, 7 pages.

Radhanath Prasad Das, "Production of Nickel and Cobalt from Secondary Sources—the Indian Experience", Erzmetall, 2001, pp. 450–454, vol. 54, No. 9, published by Regional Research Laboratory, Orissa, India, (Publication No. XP–001082739).

Alex P. et al., "Reduction Roasting–Sulphuric Acid Leaching of Nickel From A Spent Catalyst", Metals Materials and Processes, 1991, pp. 81–91, vol. 3, No. 2, published by Meshap Science Publisher, Bombay, India, (Publication No. XP–002217885).

Takaishi Kazuyuki, "Method for Recovering Nickel Sulfate From Nickel–Containing Sludge", Patent Abstracts of Japan, Sep. 18, 2001, (Publication No. 2001253719).

Database WPI, Sibe Sibtsvetmetnii, Jul. 23, 1982, published by Derwent Publications Ltd., London, Great Britain, (Publication No. XP–002217886).

* cited by examiner

Primary Examiner—George Wyszomierski
(74) Attorney, Agent, or Firm—Burns, Doane, Swecker & Mathis L.L.P.

(57) ABSTRACT

The present invention relates to a process for recovery of nickel and alumina from spent catalyst by direct leaching with sulphuric acid in presence of small amount of an additive. The invention is useful for recovery of both nickel and sources of nickel and therefore important from the view of environmental protection, resource recycling and conservation.

5 Claims, No Drawings

PROCESS FOR RECOVERY OF NICKEL FROM SPENT CATALYST

FIELD OF THE INVENTION

The present invention relates to a process for recovery of nickel from spent catalyst. The present invention also relates to a process for the recovery of nickel from spent catalyst wherein alumina is also recovered as an important by-product. The present invention particularly relates to a process for recovery of nickel and alumina from spent catalyst by direct leaching with sulphuric acid in presence of small amount of an additive. The invention is useful for recovery of both nickel and sources of nickel and therefore important from the view of environmental protection, resource recycling and conservation.

BACKGROUND OF THE INVENTION

The consumption of nickel in India is about 20,000 MTPY (metric tonnes per year which is entirely imported. Though several by-products/wastes such as nickel sludge generated during the pickling of stainless steel, grinding waste of AlNiCo magnets, and spent catalyst from the fertiliser, petrochemical and hydrogenation plants are available, at present none of such sources are being exploited commercially. Therefore, to meet the ever-growing demand, the effort has been made to provide an innovative and cost effective process for recovery of both nickel and alumina from the nickel spent catalyst of the fertiliser plants, besides producing alumina as a by-product thereby generating minimal waste for disposal.

Nickel based catalysts are the catalysts of choice in several industries due to their low cost competing substitutes. Such catalysts use alumina and silica as supports. Deactivated nickel catalysts are not considered to be regeneratable by ordinary techniques and also pose a significant waste disposal problem. Hence, it is necessary to develop new extraction techniques for processing of such spent catalyst to obtain pure metal for re-reuse.

Considerable efforts have been made to recover nickel from spent catalyst by hydrometallurgical processes. In most of the earlier work the spent catalyst had to undergo pre-treatment step to processing (Inooka Masayoshi, Japan, Kokai, Yokyo, Koho 7811621, 11 Oct. 1978; Telly, George L., U.S. Pat. No. 4,721,600, 20 Jan. 1988; Giurea et al Rom Ro 85578, 29 Sep. 1984). In general chlorination (Gravey, G., LeGroff J. and Gonin C., Jan. 8, 1980, U.S. Pat. No. 4,182,747), pressure leaching with ammonium hydroxide-ammonium carbonate or sodium hydroxide (Gutnikov G. Mar. 2, 1971, U.S. Pat. No. 3,567,433; Millsap W. A. and Reisler N., 1978, Eng. and Min J., Vol. 179 (5), p. 105.) and sodium carbonate roasting (Castange H., Gravey G. and Roth A, Feb. 21, 1978, U.S. Pat. No. 4,075,277 were applied. After a pre-treatment spent catalyst is directly is leached with water/acid/alkali. Reduction roasting followed by sulphuric acid leaching of a spent catalyst from hydrogenation plant to produce nickel oxide reported only 83% of overall recovery (P. Alex, T. K. Mukherjee and M. Sundaresan, 1991, Metals Materials and processes, Vol. 3(2), P.-81). Roasting followed by selective chlorination at 400° C. of spent catalyst under $Cl_2$+air, $Cl_2$+$N_2$ and $Cl_2$+$N_2$ was investigated and maximum recovery of only 80% was reported (Gaballah I. and Dona M., 1993, the Paul E. Queneau Int. Symp. on Extractive Metallurgy of Copper, Nickel and Cobalt, Vol. 1, p. 1253, Ed. R. G. Reddy and R. N. Weizenbach, minerals, Metals and Material Society). Direct leaching of a spent catalyst has several disadvantages such as requirement of high strength acid as high as 20–30% and poor nickel dissolution of other metal ions which are the major problems for the subsequent processing steps of final product recovery. Neutralisation of highly acidic leach liquor requires high amount of alkali and will generate huge quantity of waste cake which will add cost to the process, besides creating environmental problem.

Thought several attempts have been made to recover nickel by various processes involving pre-treatment such as roasting, reduction/alkali/chlorination roasting etc. followed by acid/alkali/neutral leaching, however, there are rarely any attempt made to accelerate the metal dissolution process by adding additive such a persulphate salts of ammonium, sodium, potassium, etc.

OBJECTS OF THE INVENTION

The main object of the present invention is to provide a process for extraction of nickel from spent catalyst which obviates the drawbacks as detailed above.

Another object of the present invention is to provide a leaching process for extraction of nickel from spent nickel catalyst in presence of little amount of catalytic established processes and avoids requirement of high strength acid for selective and quantitative dissolution of nickel from this resource.

Still another objective of the present invention is to develop a suitable process for the recovery of alumina from spent catalyst as a valuable by-product suitable for special grade refractories or for reuse as supports for catalyst.

SUMMARY OF THE INVENTION

Accordingly, the present invention provides a process for extraction of nickel from spent nickel catalyst which comprises
i) adding a persulphate based additive along with fine sized nickel catalyst in the sulphuric acid solution and stirring by a magnetic needle/glass stirrer and maintaining the solid liquid ratio in the range of ½–¹⁄₁₀ (wt./vol.),
ii) keeping the temperature of the slurry obtained in step(i) in the range of 40 to 100° C. for a period of 0.5 to 6 h,
iii) allowing the slurry to settle and then filtering the slurry to obtain leach liquor containing nickel and alumina as solid residue,
iv) washing the solid residue to remove entrapped liquor and drying at 110–120° C. to get a by-product containing high alumina,
v) purifying the said leach liquor by precipitating iron and other impurities using lime and filtering to obtain pure nickel sulphate solution,
vi) crystallising or precipitating the leach liquors to obtain nickel sulphate crystal or nickel hydroxide,
vii) reducing nickel hydroxide to obtain nickel metal powder or nickel oxide.

In an embodiment of the present invention the spent nickel catalyst used is selected from nickel catalyst having particle size in the range of −211 to +38 μm and has a composition in range:
Ni: 5–20%, Fe 0.1–1%, $Al_2O_3$: 70–90% $SO_2$: 0–6%

In another embodiment of the present invention the spent nickel catalyst used is selected from persulphate salts of sodium, potassium and ammonium and has concentration in the range of 0.25–4% (w/w).

In still another embodiment of the present invention the sulphuric acid is of commercial grade and has concentration in the range of 2–12% (v/v). This acid concentration is obtained after mixing with the wash solution generated from the leaching step earlier and is used for further leaching.

In still another embodiment of the present invention the pulp density of leaching is in the rage of 10–100%. The higher pulp density leaching generates concentrated leach solution requiring low capital investment and energy.

DETAILED DESCRIPTION OF THE INVENTION

In the process of present invention the leach slurry is filtered and the residue is washed with very dilute sulphuric acid solution. The wash liquor containing 10–30 g/L Ni is recycled for the leaching of the fresh spent catalyst is in oxide phase and dissolution in sulphuric acid occurs as:

$$NiO + H_2SO_4 \longrightarrow NiSO_4 + H_2O \qquad (1)$$

The iron free leach liquor is evaporated crystallize nickel as nickel sulphate. The purified leaching liquor can also be precipitated as nickel hydroxide and nickel metal from this can be obtained by known method called hydrogen/carbothermic reduction process. Alternatively nickel metal powder can be produced by the known process by aqueous hydrogen reduction of purified leach liquor.

Novelty of the present invention is the use of a catalytic additive which has not been used earlier for direct leaching of nickel catalyst to recover nickel and alumina simultaneously. Another feature of the invention is complete nickel dissolution (99.9%) from the spent catalyst without any prior treatment such as roasting, reduction/alkali/chlorination roasting etc. which are necessary steps in earlier development. The complete dissolution of nickel in the leaching stage produces very bright coloured alumina as a valuable by-product, which may find applications as high alumina refractoriness and a support for catalyst.

The following examples are given by way of illustration and should not be construed to limit the scope of invention.

EXAMPLE-1

A conical flask containing 200 ml 3 vol % sulphuric acid is kept over a thermostatically controlled hot plate fitted with stirring arrangement by a magnetic needle. The temperature of the solution is maintained at 70° C. 50 g of nickel catalyst of composition: 9.70% Ni, 0.31% Fe, 81.3% $Al_2O_3$, and 3.77% $SiO_2$ is added to the flask with stirring. Samples collected at different time intervals are filtered and analyzed for nickel content. Recovery of nickel increases with leaching time. Recovery data at different time intervals are incorporated in Table 1. A maximum of 11.95% nickel recovery is achieved in 6 h.

TABLE 1

Percentage nickel recovery at different time intervals.

| Parameters | Percentage recovery | | | | | |
|---|---|---|---|---|---|---|
| | 0.25 h | 0.5 h | 1 h | 2 h | 4 h | 6 h |
| T:70, Acid: 3%, ADS: Nil NC: 50 g, S/L: ¼ (wt/vol.) | — | 3.83 | 4.91 | 6.14 | 9.1 | 11.95 |

T(temp): ° C., and acid: vol. $H_2SO_4$, NC: nickel catalyst, ADS: additive

EXAMPLE-2

A conical flask containing 200 ml of 3vol. % of concentrated sulphuric acid is kept over a thermostatically controlled hot plate fitted with a magnetic stirrer. Temperature of the solution is raised to 90° C. and 50 g of nickel catalyst of composition: 9.70% Ni, 0.31% Fe, 81.33% $Al_2O_3$ and 3.77% $SiO_2$ is added. Once the leaching proceeded with stirring, the samples are collected at different time intervals, filtered and analyzed for nickel. Extraction data at different time intervals are incorporated in Table 2. Recovery of nickel increases with leaching time and a maximum of 50.390% nickel recovery is achieved in 6 h.

TABLE 2

Recovery of nickel at different time intervals.

| Parameters | Percentage recovery | | | | | |
|---|---|---|---|---|---|---|
| | 0.25 h | 0.5 h | 1 h | 2 h | 4 h | 6 h |
| T:90, Acid: 3%, ADS: Nil NC: 50 g, S/L: ¼ (wt/vol.) | — | 9.44 | 15.42 | 23.30 | 41.70 | 50.39 |

T(temp): ° C., and acid: vol. $H_2SO_4$, NC: nickel catalyst, ADS: additive

EXAMPLE 3

200 ml of water containing 3 vol. % of concentrated sulphuric acid in a conical flask is kept over a thermostatically controlled hot plate fitted with a magnetic stirrer. After maintaining the temperature of the solution at 70° C., 50 g of nickel catalyst of composition: 9.70% Ni, 0.31% Fe, 81.3% $Al_2O_3$, and 3.77% $SiO_2$ and 0.5 g of persulphate salt are added. Temperature of the slurry is maintained through out the leaching experiment. Leaching is carried out by agitating the slurry. Samples collected at different time intervals are filtered and leach liquor is analysed for nickel. The recovery data at different time intervals are incorporated in Table 3. A Maximum of 97.50% of nickel recovery is achieved in 6 h of leaching time as compared to only 11.95% nickel recovery in absence of additive.

TABLE 3

Effect of additive on the percentage nickel recovery at different time intervals.

| Parameters | Percentage recovery | | | | | |
|---|---|---|---|---|---|---|
| | 0.25 h | 0.5 h | 1 h | 2 h | 4 h | 6 h |
| T:70, Acid: 3%, ADS: 0.25% NC: 50 g, S/L: ¼ (wt/vol.) | 6.2 | 19.5 | 74.6 | 92.3 | 95.3 | 97.5 |

T(temp): ° C., and acid: vol. $H_2SO_4$, NC: nickel catalyst, ADS: additive

EXAMPLE 4

A solution containing 200 ml of water with 3 vol. % concentrated sulphuric acid in a conical flask is kept over a thermostatically controlled hot plate fitted with a magnetic stirring system. The solution temperature is raised to 70° C. and 50 g of spent nickel catalyst of composition: 9.70% Ni, 0.31% Fe, 81.3% $Al_2O_3$, and 3.77% $SiO_2$ and 1.0 g of persulphate salt are added to the system. The above temperature is maintained while stirring through out the leaching experiment. Very fast reaction occurs in presence of additive. Samples collected at deferent time intervals are filtered and the leach liquor analysed for nickel. Recovery data at different time intervals are incorporated in Table4. About 98% of nickel recovery is achieved within 2 h of leaching and a maximum of 99.6% nickel recovery is achieved in 6 hours of leaching.

TABLE 4

Effect of higher dose of additive on % nickel recovery at different time intervals.

| Parameters | Percentage recovery | | | | | |
|---|---|---|---|---|---|---|
| | 0.25 h | 0.5 h | 1 h | 2 h | 4 h | 6 h |
| T:70, Acid: 3%, ADS: 0.5% NC: 50 g, S/L: ¼ (wt/vol.) | 9.1 | 54.24 | 85.42 | 98.15 | 98.80 | 99.6 |

T(temp): ° C., and acid: vol. $H_2SO_4$, NC: nickel catalyst, ADS: additive

EXAMPLE 5

The temperature of a solution containing 200 ml of 3 vol. % of concentrated sulphuric acid in a conical flask is maintained at 90° C. by a thermostatically controlled hot plate fitted with a magnet6ic stirring arrangement. 50 g of nickel catalyst of composition: 9.70% Ni, Fe. 81.3% $Al_2O_3$, and 3.77% $SiO_2$ and 1 g of persulphate salt are added to the system. Temperature of the reaction is maintained through out the leaching experiment. Samples collected at different time intervals are filtered and leach solution is analysed for nickel content. Nickel recovery at different time intervals summarised in Table 5. About 99% of nickel recovery is achieved within 1 h of leaching.

TABLE 5

Effect of higher temperature in presence of additive on the nickel recovery.

| Parameters | Percentage recovery | | | | | |
|---|---|---|---|---|---|---|
| | 0.1 h | 0.25 h | 0.5 h | 1 h | 2 h | 4 h |
| T:90, Acid: 3%, ADS: 0.5% NC: 50 g, S/L: ¼ (wt/vol.) | 83.4 | 93.3 | 96.7 | 99.6 | — | — |

T(temp): ° C., and acid: vol. $H_2SO_4$, NC: nickel catalyst, ADS: additive

EXAMPLE 6

2L of 6 vol. % sulphuric acid solution in a 3L beaker is kept over a hot plate and temperature is maintained at 80° C. It is kept under stirring with the help of a glass stirrer fitted to a motor. 1 kg of spent catalyst of composition: 9.70% Ni, 0.31% Fe, 81.3% $Al_2O_3$, and 3.77% SiO2 and 15 g of persulphate salt are added to the acid solution under stirring while maintaining the pulp density of 59%. After 2 h of leaching the slurry is kept for settling, within 2 h about 70% of the slurry settles. The clear supernatant is taken out and the thick slurry is filtered. The leach liquor, wash solution and residue analysis is given in Table 6. Residue basis nickel recovery obtained is more than 99.9%. The dried residue containing 96.2% $Al_2O_3$, with 3.85% $SiO_2$ and 0.0093% Ni is suitable for various applications.

TABLE 6

Results of leaching experiment on 1 Kg scale.

| No. | Component | Quantity | Analysis |
|---|---|---|---|
| 1 | Leach liquor | 1.65 l | Ni-51.2 g/l |
| 2 | Wash solution | 0.61 l | Ni-19.75 g/l |
| 3 | Leach residue (dry) | 0.855 kg | $Al_2O_3$ - 96.1%; $SiO_2$ - 3.85% Ni - 0.0093% |

The Major Advantages of the Present Invention are:
1. Elimination of pre-treatment step which is carried out at higher temperature, prior to leaching as required in the developed process, results in cost and energy saving.
2. With no gas emission, the process is much eco-friendly.
3. The process requires only little excess to the stoichiometric amount of acid in presence of additive for complete dissolution of nickel.
4. Bright white coloured leach alumina residue obtained is a high value by-product.
5. The process operates at very low temperature and low acid concentration, and therefore special material of construction is not required.
6. The process requires less amount of alkali in the purification step and generates less amount of residue, and therefore account for low loss of metal values at this stage.
7. High pulp density leaching generates concentrated leach solution and requires less heat energy for crystallisation and less capital cost.
8. The process is much less corrosive a compared to chlorination roasting often followed.
9. The process is very simple and involves lesser number of steps.
10. The process requires much less capital investment and can be operational in medium and small scale.

We claim:

1. A process for extraction of nickel from spent nickel catalyst which comprises
    i) adding a persulphate-based additive along with fine sized nickel catalyst in a sulphuric acid solution and stirring by a magnetic needle/glass stirrer and maintaining the solid liquid ratio in the range of ½–¹⁄₁₀ (wt. in grams/vol. in mL) to obtain a slurry,
    ii) keeping the temperature of the slurry obtained in step (i) in the range of 40 to 100° C. for a period of 0.5 to 6 h,
    iii) allowing the slurry to settle and then filtering the slurry to obtain (a) a leach liquor containing nickel and (b) an alumina as a solid residue,
    iv) washing the solid residue to remove entrapped liquor and drying at 110–120° C. to get a by-product containing high alumina,
    v) purifying the leach liquor by precipitating iron and other impurities using lime and filtering to obtain a pure nickel sulphate solution,
    vi) crystallizing or precipitating the leach liquors to obtain nickel sulphate crystal and nickel hydroxide, and
    vii) reducing nickel hydroxide to obtain nickel metal powder or nickel oxide.

2. A process as claimed in claim 1 wherein the spent nickel catalyst used is selected from nickel catalyst having particle size in the range of 38 µm–211 µm and has a composition in range Ni:5–20%, Fe 0.1–1%, $Al_2O_3$: 70–90%, and $SO_2$: 0–6%.

3. A process as claimed in claim 1 wherein the persulphate-based additive is selected from persulphate salts of sodium, potassium and ammonium and has a salt to catalyst concentration in the range of 0.25–4% (w/w).

4. A process as claimed in claim 1 wherein the sulphuric acid is of commercial grade and has concentration in the range of 2–12% (v/v).

5. A process as claimed in claim 1 wherein the concentration of the pulp in the slurry in step (i) is in the range of 10–100%.

* * * * *